(12) United States Patent
Kim et al.

(10) Patent No.: US 9,913,292 B2
(45) Date of Patent: Mar. 6, 2018

(54) METHOD AND DEVICE FOR RESTRICTED ACCESS WINDOW-BASED CHANNEL ACCESS IN WLAN SYSTEM

(71) Applicant: LG ELECTRONICS INC., Seoul (KR)

(72) Inventors: Jeongki Kim, Anyang-si (KR); Yongho Seok, Anyang-si (KR); Hangyu Cho, Anyang-si (KR); Jinsoo Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 14/651,192

(22) PCT Filed: Dec. 11, 2013

(86) PCT No.: PCT/KR2013/011468
§ 371 (c)(1),
(2) Date: Jun. 10, 2015

(87) PCT Pub. No.: WO2014/092450
PCT Pub. Date: Jun. 19, 2014

(65) Prior Publication Data
US 2015/0334742 A1    Nov. 19, 2015

Related U.S. Application Data

(60) Provisional application No. 61/735,994, filed on Dec. 11, 2012.

(51) Int. Cl.
*H04W 74/04* (2009.01)
*H04W 84/12* (2009.01)

(52) U.S. Cl.
CPC ............ *H04W 74/04* (2013.01); *H04W 84/12* (2013.01)

(58) Field of Classification Search
None
See application file for complete search history.

(56) References Cited

U.S. PATENT DOCUMENTS 9,155,027 B1 * 10/2015 Liu ..................... H04W 74/006
2005/0064818 A1    3/2005 Assarsson et al.
(Continued)

FOREIGN PATENT DOCUMENTS

| EP | 1615381 | 1/2006 |
| KR | 10-2012-0123997 | 11/2012 |
| WO | 2012/160510 | 11/2012 |

OTHER PUBLICATIONS

PCT International Application No. PCT/KR2013/011468, Written Opinion of the International Searching Authority dated Mar. 31, 2014, 15 pages.

*Primary Examiner* — Peter Chau
(74) *Attorney, Agent, or Firm* — Lee Hong Degerman Kang & Waimey

(57) ABSTRACT

The present invention relates to a wireless communication system. More particularly, a method and a device for restricted access window-based channel access in a WLAN system are disclosed. The method whereby a station (STA) performs channel access in a wireless communication system according to one embodiment of the present invention may comprise the steps of: receiving restricted access window (RAW) cross-border transmission allowance (CBTA) information from an access point (AP) in case an RAW is allocated to the STA; and performing transmission by the STA on the basis of the RAW CBTA information. In case the RAW CBTA information is configured as a first value, transmission by the STA beyond the border of the RAW may be allowed.

14 Claims, 13 Drawing Sheets

(56) References Cited

U.S. PATENT DOCUMENTS

| | | | |
|---|---|---|---|
| 2010/0020769 A1 | 1/2010 | Ma et al. | |
| 2013/0044687 A1* | 2/2013 | Liu | H04W 8/26 |
| | | | 370/328 |
| 2013/0128798 A1* | 5/2013 | Liu | H04W 48/12 |
| | | | 370/312 |
| 2013/0195036 A1* | 8/2013 | Quan | H04W 72/04 |
| | | | 370/329 |
| 2014/0071900 A1* | 3/2014 | Park | H04W 74/04 |
| | | | 370/329 |
| 2014/0146725 A1* | 5/2014 | Merlin | H04W 72/0446 |
| | | | 370/311 |

* cited by examiner

METHOD AND DEVICE FOR RESTRICTED ACCESS WINDOW-BASED CHANNEL ACCESS IN WLAN SYSTEM

CROSS-REFERENCE TO RELATED APPLICATIONS

This application is the National Stage filing under 35 U.S.C. 371 of International Application No. PCT/KR2013/011468, filed on Dec. 11, 2013, which claims the benefit of U.S. Provisional Application No. 61/735,994, filed on Dec. 11, 2012, the contents of which are all hereby incorporated by reference herein in their entirety.

TECHNICAL FIELD

The present invention relates to a wireless communication system and, more particularly, to a restricted access window based channel access method and apparatus in a wireless local area network system.

BACKGROUND ART

Along with recent advances in information and communication technologies, various wireless communication technologies have been developed. Thereamong, a wireless local area network (WLAN) enables users to wirelessly access the Internet through their portable terminals such as personal digital assistants (PDAs), laptop computers, and portable multimedia players (PMPs) in homes, offices, or specific service areas, based on wireless frequency technology.

To overcome limits to communication speed, which are a weakness of WLAN, systems for increasing speed and reliability of a network and extending wireless network coverage have been introduced in recent technology standards. For example, IEEE 802.11n supports a high throughput (HT) of data processing rate of up to 540 Mbps and adopts multiple input and multiple output (MIMO) technology in both a transmitter and a receiver in order to minimize transmission errors and optimize data rate.

DETAILED DESCRIPTION OF THE INVENTION

Technical Problems

As next-generation communication technology, machine-to-machine (M2M) communication technology has been discussed. Even in an IEEE 802.11 WLAN system, a standard for supporting M2M communication has been developed as IEEE 802.11ah. A scenario in which devices occasionally exchange less data at low speed in an environment in which many devices are present may be considered in M2M communication.

Communication in a WLAN system is performed in a medium shared between all devices. When the number of devices increases as in M2M communication, if much time is consumed to access a channel of one device, overall system performance may be deteriorated and power saving of each device may be hindered.

In such a WLAN system, allocating a restricted access window (RAW) to a device has been discussed. However, when the RAW is allocated, it is not clear whether to permit channel access extended across the boundary of the RAW.

An object of the present invention is to provide a method for establishing whether to permit channel access related to the boundary of a RAW when the RAW is allocated.

The technical objects that can be achieved through the present invention are not limited to what has been particularly described hereinabove and other technical objects not described herein will be more clearly understood by persons skilled in the art from the following detailed description.

Technical Solutions

According to an aspect of the present invention, provided herein is a method for performing channel access by a station (STA) in a wireless communication system, including receiving restricted access window (RAW) cross boundary transmission allowance (CBTA) information from an access point (AP) when a RAW is allocated to the STA; and performing transmission from the STA based on the RAW CBTA information, wherein, when the RAW CBTA information is set to a first value, transmission of the STA extended across a boundary of the RAW is permitted.

In another aspect of the present invention, provided herein is a method for supporting channel access of a station (STA) by an access point (AP) in a wireless communication system, including transmitting restricted access window (RAW) cross boundary transmission allowance (CBTA) information to the STA when a RAW is allocated to the STA; and performing transmission from the STA based on the RAW CBTA information, wherein, when the RAW CBTA information is set to a first value, transmission of the STA extended across a boundary of the RAW is permitted.

In another aspect of the present invention, provided herein is a station (STA) for performing channel access in a wireless communication system, including a transceiver; and a processor, wherein the processor is configured to receive restricted access window (RAW) cross boundary transmission allowance (CBTA) information from an access point (AP) using the transceiver when a RAW is allocated to the STA; and perform transmission from the STA using the transceiver based on the RAW CBTA information, and wherein, when the RAW CBTA information is set to a first value, transmission of the STA extended across a boundary of the RAW is permitted.

In another aspect of the present invention, provided herein is An access point (AP) for supporting channel access of a station (STA) in a wireless communication system, including a transceiver; and a processor, wherein the processor transmits restricted access window (RAW) cross boundary transmission allowance (CBTA) information to the STA using the transceiver when a RAW is allocated to the STA; and performs transmission from the STA based on the RAW CBTA information, and wherein, when the RAW CBTA information is set to a first value, transmission of the STA extended across a boundary of the RAW is permitted.

The followings may be commonly applied to the above aspects of the present invention.

When the RAW CBTA information is set to a second value, transmission of the STA extended across the boundary of the RAW may not be permitted.

The RAW may be divided into one or more slots. When transmission of the STA extended across a boundary of the one or more slots is permitted, transmission from the STA may be performed based on the RAW CBTA information.

The RAW CBTA information may be included in a RAW parameter set information element (RPS IE).

The RPS ID may be received from the AP through a beacon frame.

One or more RAW CBTA information may be received from the AP in the middle of the RAW.

The one or more RAW CBTA information may be received from the AP through a null-data packet (NDP) frame or a control frame.

The NDP frame may be an NDP clear-to-send (CTS) frame or an NDP acknowledgement (ACK) frame.

The control frame may be a CTS frame or an ACK frame.

Transmission from the STA may be performed based on lastly received RAW CBTA information among the one or more RAW CBTA information.

The RAW may be divided into one or more slots and the one or more RAW CBTA information may be transmitted after start of the one or more slots or before a boundary of the RAW.

The foregoing general description and following detailed description of the present invention are exemplary and explanatory and are intended to provide further explanation of invention claimed.

Advantageous Effects

According to the present invention, a method and apparatus for establishing whether to permit channel access related to the boundary of a RAW when the RAW is allocated can be provided.

The effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
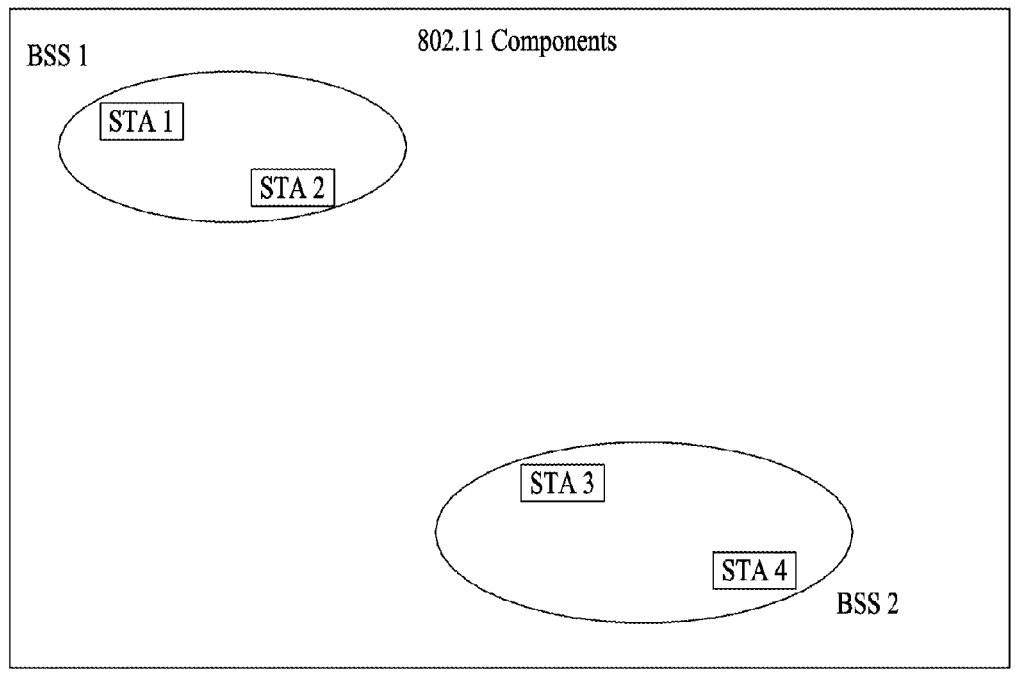
FIG. 1 is a diagram showing an exemplary structure of an IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, evolved-UTRA (E-UTRA), etc. For clarity, the present disclosure focuses on 3GPP LTE and LTE-A systems. However, the technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
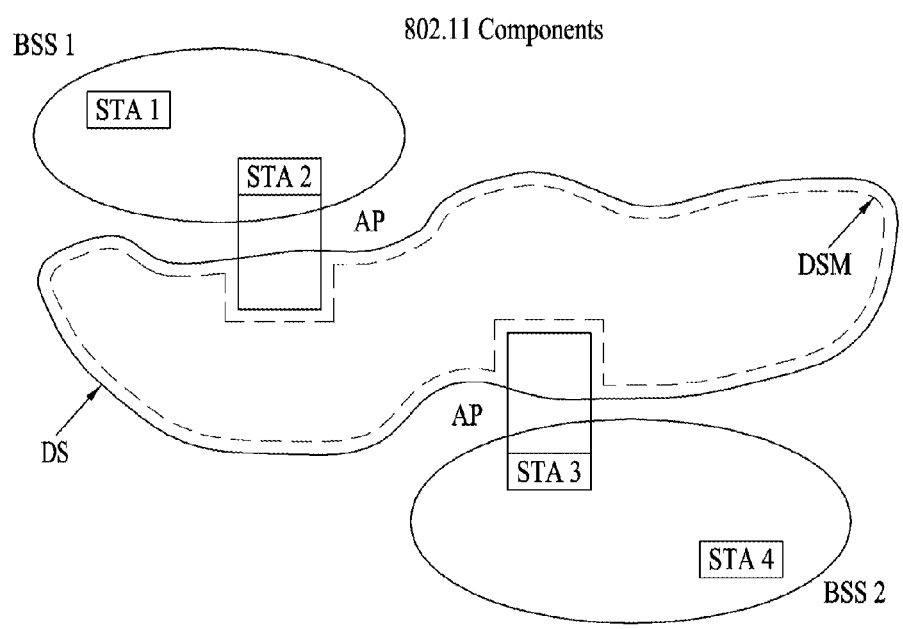
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
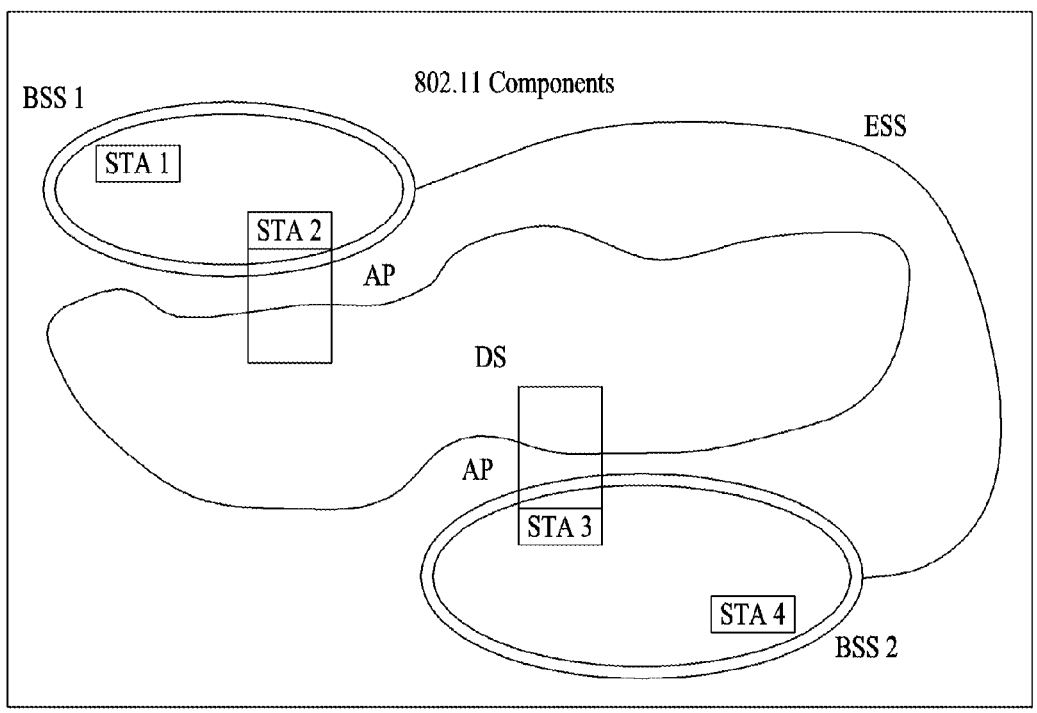
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
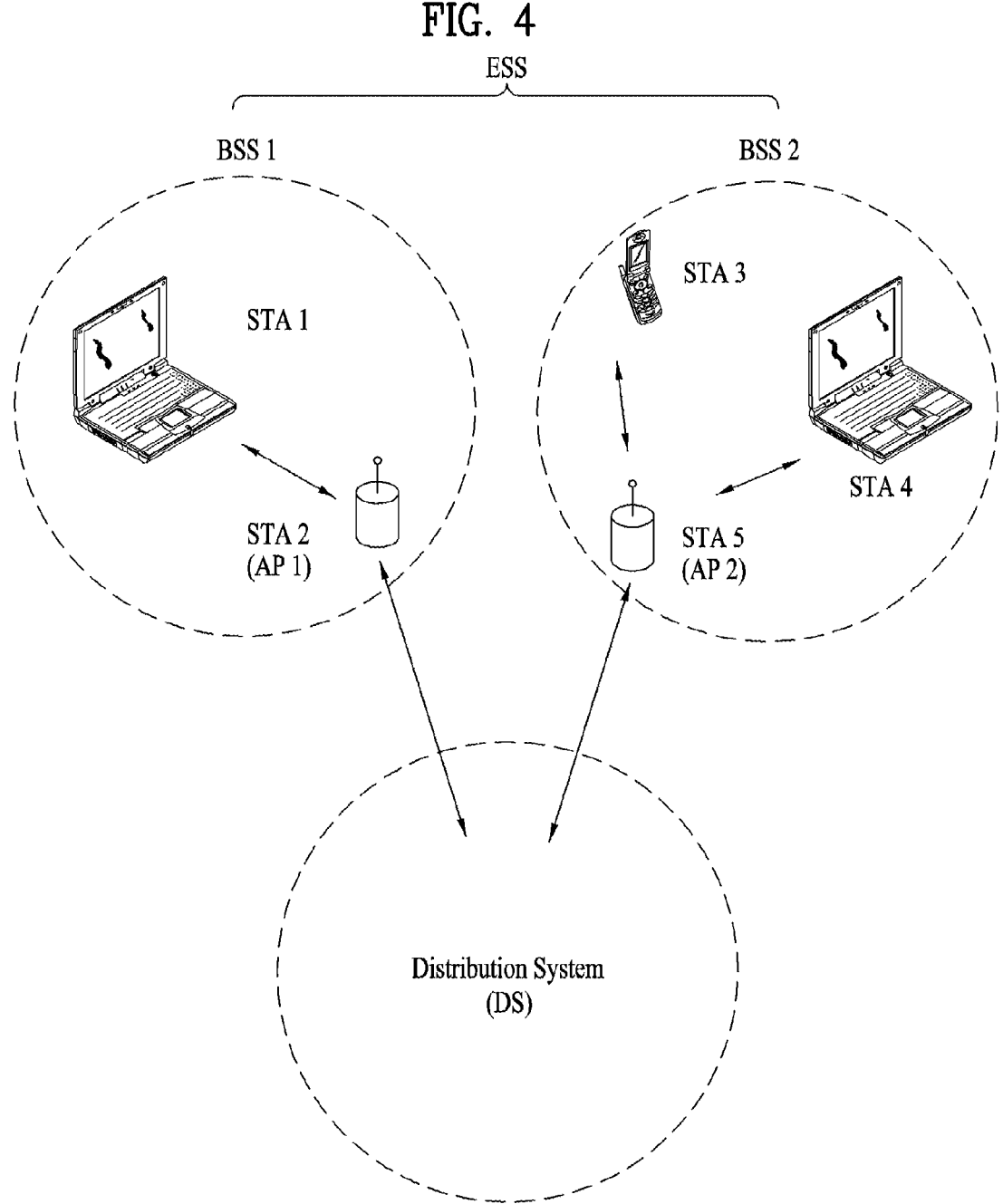
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Link Setup Process

Figure 5:
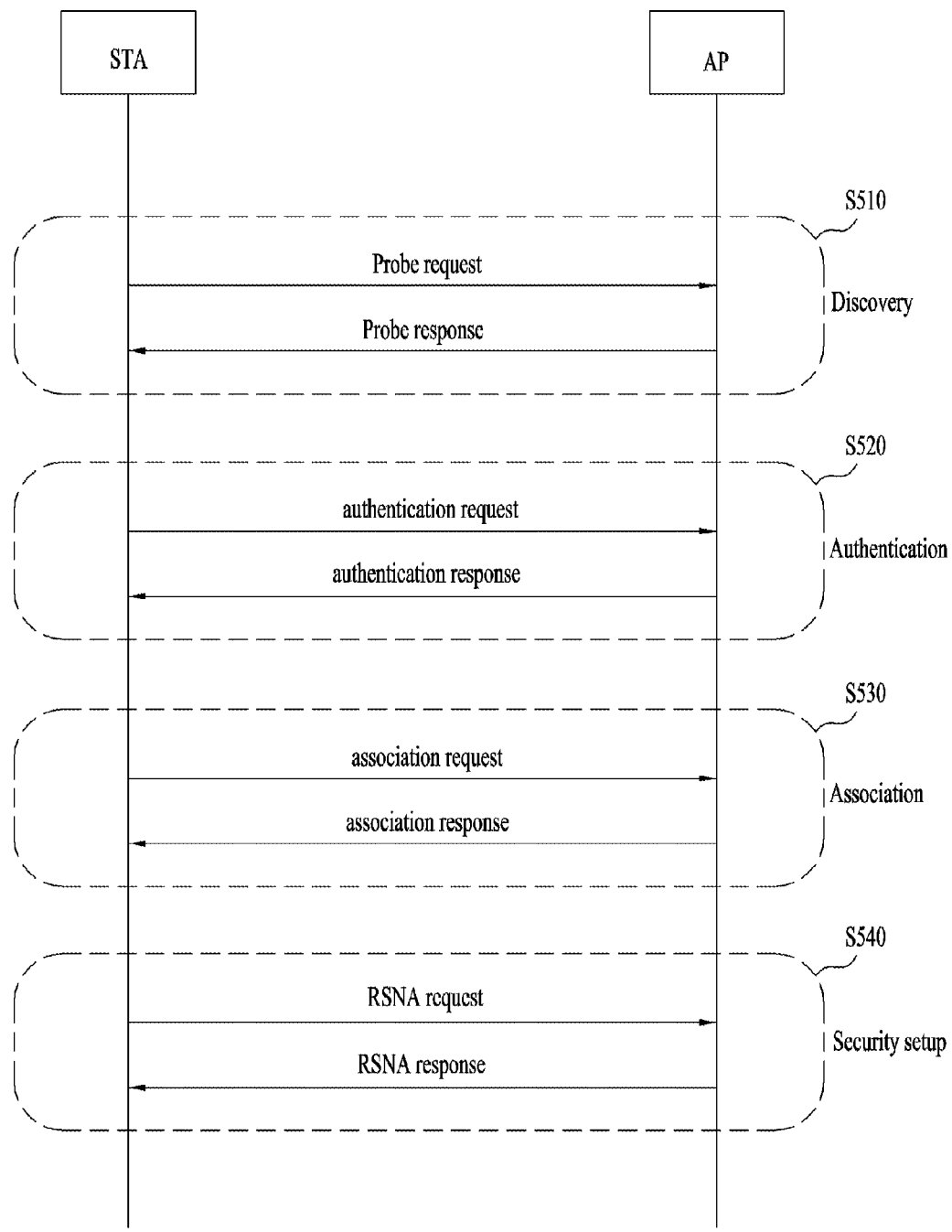
FIG. 5 is a diagram for explaining a general link setup process.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation processor or a session setup process. In addition, discovery, authentication, association, and security setup of the link setup process may also be called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information contained in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information contained in the beacon frame and records beacon frame information on each channel while moving to another channel. Upon receiving the beacon frame, the STA may store BSS-related information contained in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The-above mentioned information contained in the authentication frame may correspond to some parts of information capable of being contained in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11 WLAN systems which have been recently proposed to support a data processing rate of 1 Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support of WLAN system operations in whitespace (WS) has been discussed. For example, technology for introducing the WLAN system in TV WS such as an idle frequency band (e.g. 54 to 698 MHz band) due to transition to digital TVs from analog TVs has been discussed under the IEEE 802.11af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided by regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support of extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may sense a wireless channel or a medium during a predetermined time duration (e.g. DCF interframe space (DIFS) before starting transmission. As a result of sensing, if it is determined that the medium is in an idle status, the AP and/or the STA starts frame transmission using the medium. Meanwhile, if it is sensed that the medium is in an occupied state, the AP and/or the STA does not start its transmission and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving QoS of a WLAN and QoS data may be transmitted in both a contention period (CP) and a contention-free period (CFP).

Figure 6:
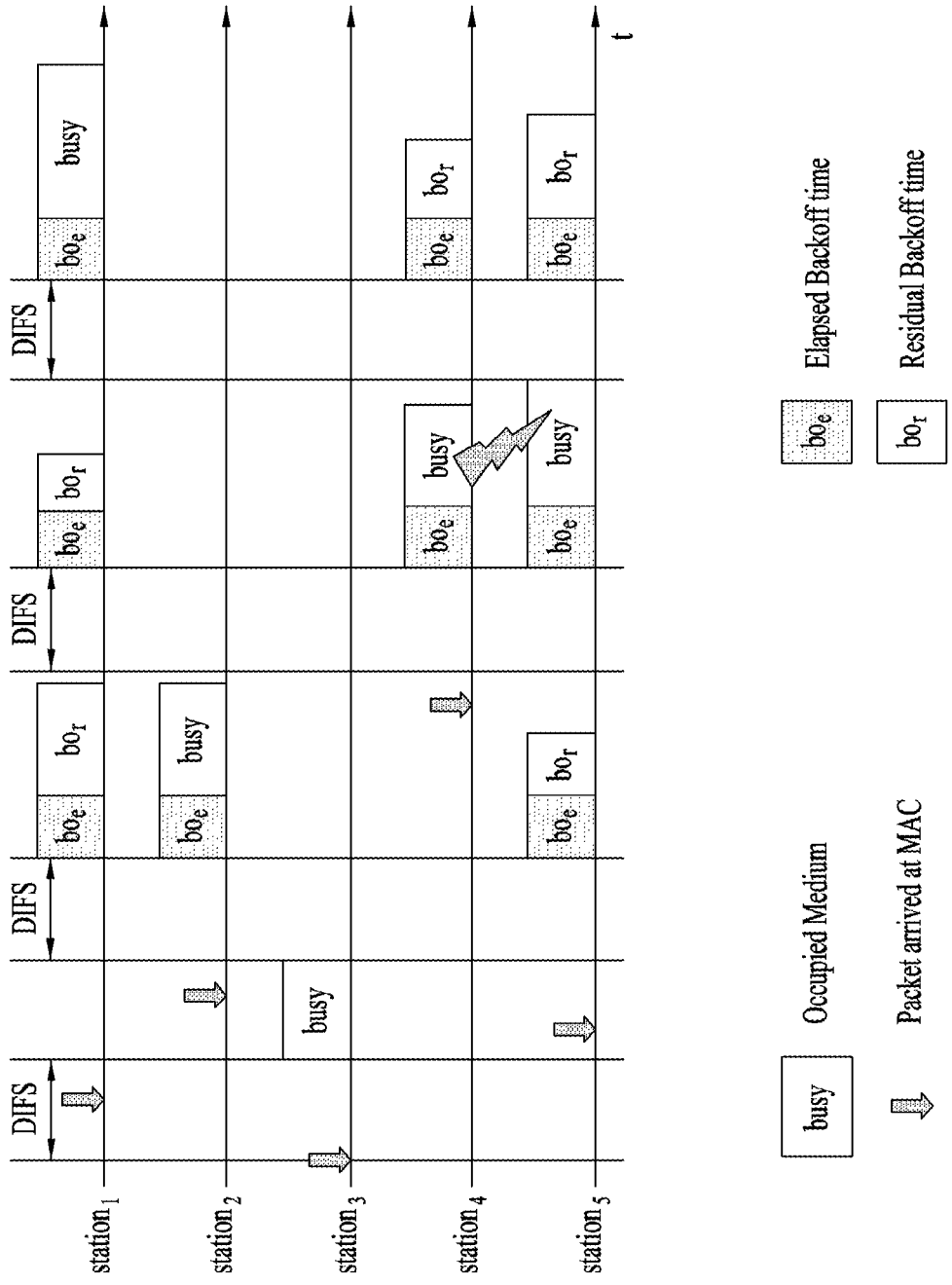
FIG. 6 is a diagram for explaining a backoff process.

FIG. 6 is a diagram for explaining a backoff process.

Operations based on a random backoff period will now be described with reference to FIG. 6. If a medium of an occupied or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to one of 0 to CW values. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. Desirably, CW, CWmin, and CWmax are set to 2n−1 (where n=0, 1, 2, . . . ).

If the random backoff process is started, the STA continuously monitors the medium while counting down the backoff slot in response to the determined backoff count value. If the medium is monitored as the occupied state, the countdown stops and waits for a predetermined time. If the medium is in the idle status, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each STA waits for the DIFS time and then may perform countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a predetermined time DIFS and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may increase the CW value by two times, select a random backoff count value, and then perform countdown. Meanwhile, STA1 waits for a predetermined time while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly senses a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate a time remaining until an AP and/or an STA which is currently using the medium or has authority to use the medium enters an available state to another AP and/or STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, NAV may be set according to the value of a 'duration' field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

Figure 7:
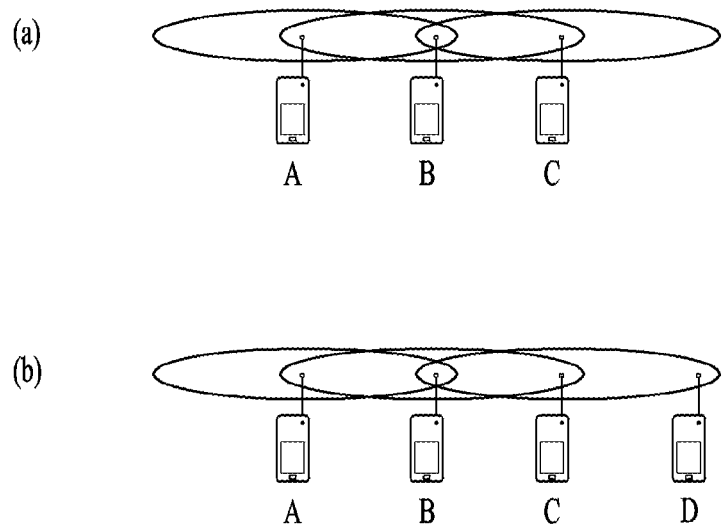
FIG. 7 is a diagram for explaining a hidden node and an exposed node.

FIG. 7 is a diagram for explaining a hidden node and an exposed node.

FIG. 7(a) exemplarily shows a hidden node. In FIG. 7(a), STA A communicates with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in occurrence of collision. Here, STA A may be considered a hidden node of STA C.

FIG. 7(b) exemplarily shows an exposed node. In FIG. 7(b), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
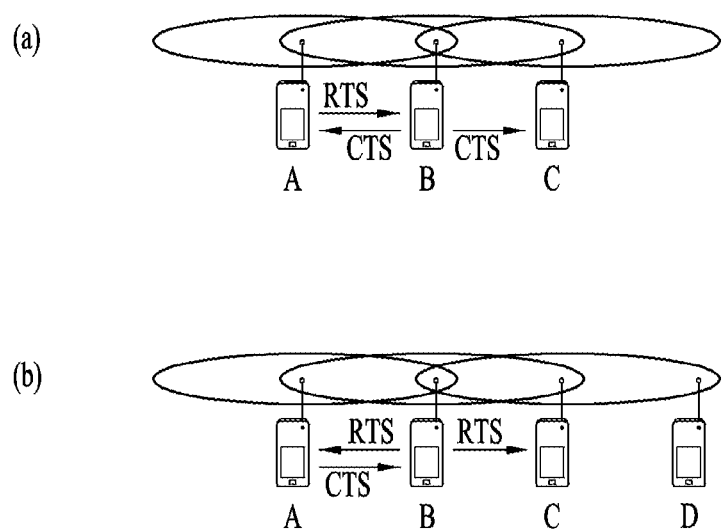
FIG. 8 is a diagram for explaining request to send (RTS) and clear to send (CTS).

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by peripheral STA(s), so that the peripheral STA(s) may consider whether information is transmitted between the two STAs. For example, if an STA to be used for data transmission transmits an RTS frame to an STA receiving data, the STA receiving data may inform peripheral STAs that itself will receive data by transmitting a CTS frame to the peripheral STAs.

FIG. 8(*a*) exemplarily shows a method for solving problems of a hidden node. In FIG. 8(*a*), it is assumed that both STA A and STA C are ready to transmit data to STA B. If STA A transmits RTS to STA B, STA B transmits CTS to each of STA A and STA C located in the vicinity of the STA B. As a result, STA C waits for a predetermined time until STA A and STA B stop data transmission, thereby avoiding collision.

FIG. 8(*b*) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all peripheral STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
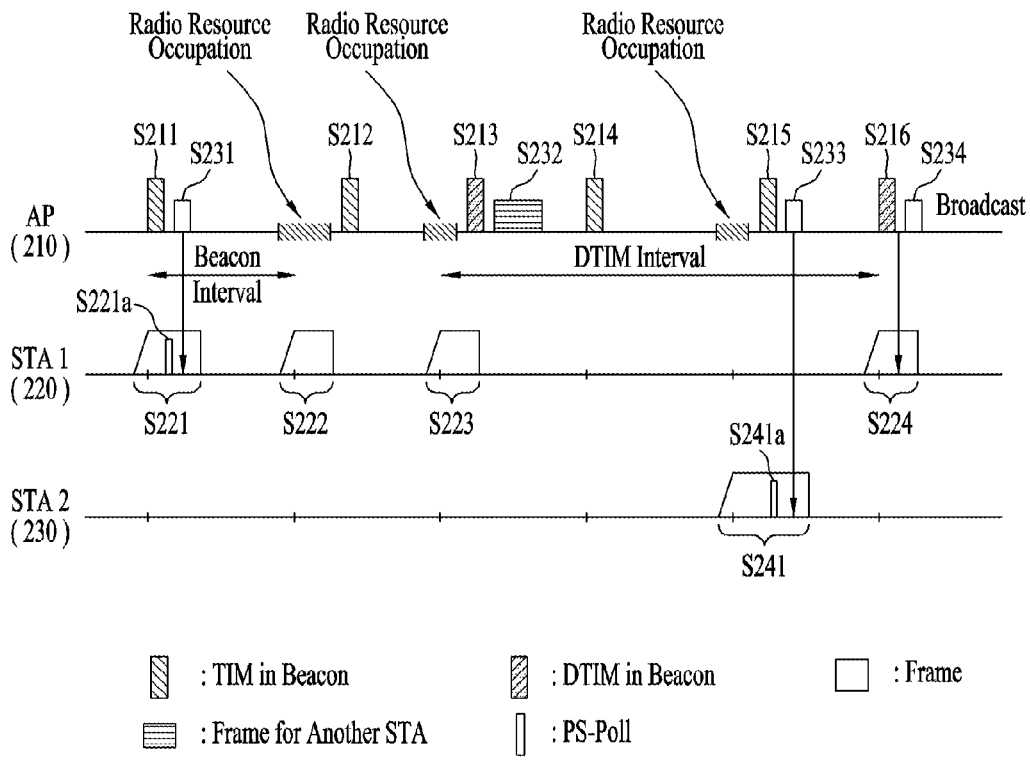
FIG. 9 is a diagram for explaining a PM operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame to the AP 210 (S221*a*). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element configured as a DTIM. However, since the busy medium state is given, the AP 210 transmits the beacon frame at a delayed time (S213). STA1 220 is switched to the awake state in response to the beacon interval and may obtain a DTIM through the beacon frame transmitted by the AP 210. It is assumed that the DTIM obtained by STA1 220 does not have a frame to be transmitted to STA1 220 and there is a frame for another STA. In this case, STA1 220 may confirm the absence of a frame to be received in the STA1 220 and re-enters the sleep state so that the STA1 220 may operate in the sleep state. After transmitting the beacon frame, the AP 210 transmits the frame to the corresponding STA (S232).

The AP 210 fourthly transmits the beacon frame (S214). However, since it was impossible for STA1 220 to obtain information regarding the presence of buffered traffic associated therewith through previous double reception of a TIM element, STA1 220 may adjust the wakeup interval for receiving the TIM element. Alternatively, provided that signaling information for coordination of the wakeup interval value of STA1 220 is contained in the beacon frame transmitted by the AP 210, the wakeup interval value of the STA1 220 may be adjusted. In this example, STA1 220, which has been switched to receive a TIM element every beacon interval, may be configured to be switched to another operation state in which STA1 220 awakes from the sleep state once every three beacon intervals. Therefore, when the AP 210 transmits a fourth beacon frame (S214) and transmits a fifth beacon frame (S215), STA1 220 maintains the sleep state such that it cannot obtain the corresponding TIM element.

When the AP 210 sixthly transmits the beacon frame (S216), STA1 220 is switched to the awake state and operates in the awake state, so that the STA1 220 may obtain the TIM element contained in the beacon frame (S224). The TIM element is a DTIM indicating the presence of a broadcast frame. Accordingly, STA1 220 does not transmit the PS-Poll frame to the AP 210 and may receive the broadcast frame transmitted by the AP 210 (S234). In the meantime, the wakeup interval configured for STA2 230 may be longer than the wakeup interval of STA1 220. Accordingly, STA2 230 may enter the awake state at a specific time (S215) where the AP 210 fifthly transmits the beacon frame and receives the TIM element (S241). STA2 230 may recognize the presence of a frame to be transmitted thereto through the TIM element and transmit the PS-Poll frame to the AP 210 to request frame transmission (S241a). The AP 210 may transmit the frame to STA2 230 in response to the PS-Poll frame (S233).

In order to manage a PS mode shown in FIG. 9, the TIM element may include either a TIM indicating the presence or absence of a frame to be transmitted to the STA or include a DTIM indicating the presence or absence of a broadcast/multicast frame. The DTIM may be implemented through field setting of the TIM element.

Figure 10:
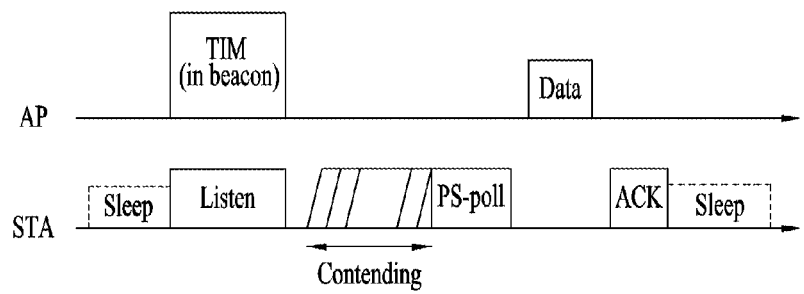
FIGS. 10 to 12 are diagrams for explaining detailed operations of an STA that has received a TIM.
Figure 11:
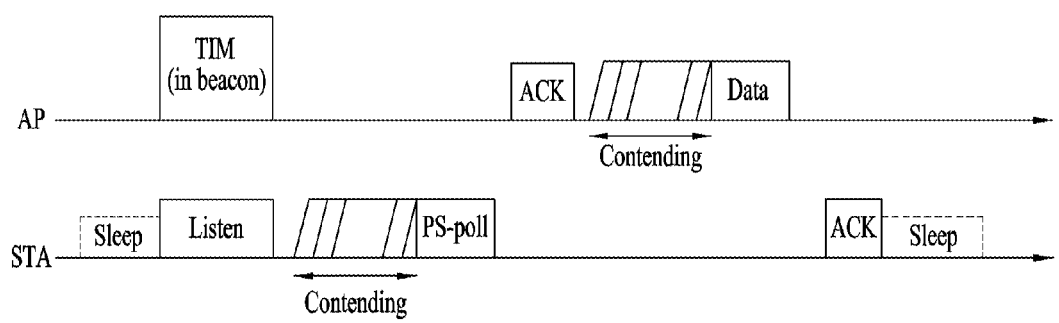
Figure 12:
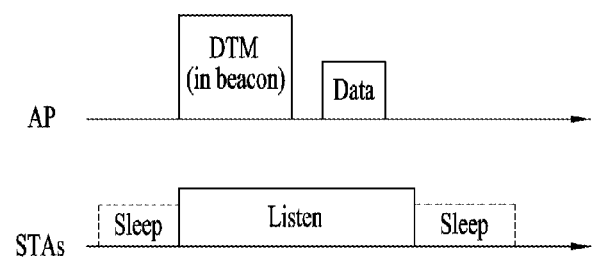

FIGS. 10 to 12 are diagrams for explaining detailed operations of an STA that has received a TIM.

Referring to FIG. 10, an STA is switched from a sleep state to an awake state so as to receive a beacon frame including a TIM from an AP. The STA may recognize the presence of buffered traffic to be transmitted thereto by interpreting the received TIM element. After contending with other STAs to access a medium for PS-Poll frame transmission, the STA may transmit the PS-Poll frame for requesting data frame transmission to the AP. Upon receiving the PS-Poll frame transmitted by the STA, the AP may transmit the frame to the STA. The STA may receive a data frame and then transmit an ACK frame to the AP in response to the received data frame. Thereafter, the STA may re-enter the sleep state.

As illustrated in FIG. 10, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme and this will be described with reference to FIG. 11.

The STA operations of FIG. 11 in which an STA is switched from a sleep state to an awake state, receives a TIM from an AP, and transmits a PS-Poll frame to the AP through contention are identical to those of FIG. 10. Even upon receiving the PS-Poll frame, if the AP does not prepare a data frame during an SIFS time, the AP may transmit an ACK frame to the STA instead of transmitting the data frame. If the data frame is prepared after transmission of the ACK frame, the AP may transmit the data frame to the STA after completion of contention. The STA may transmit the ACK frame indicating that the data frame has successfully been received to the AP and transition to the sleep state.

FIG. 12 illustrates an exemplary case in which an AP transmits a DTIM. STAs may be switched from the sleep state to the awake state so as to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintains the awake state after reception of the beacon frame including the DTIM, the STAs may receive data and then switch to the sleep state after completion of data reception.

PPDU Frame Format

A physical layer convergence protocol (PLCP) packet data unit (PPDU) frame format may include a short training field (STF), a long training field (LTF), a signal (SIG) field, and a data field. The most fundamental (e.g. non-high throughput (HT)) PPDU frame format may include only a legacy-STF (L-STF), a legacy-LTF (L-LTF), a SIG field, and a Data field. Additional STF, LTF, and SIG field (or an STF, an LTF, and a SIG field of another type) may be included between the SIG field and the Data field according to the type of the PPDU frame format (e.g. an HT-mixed format PPDU, an HT-greenfield format PPDU, a very high throughput (VHT) PPDU, etc.).

The STF is a field for signals for signal detection, automatic gain control (AGC), diversity selection, accurate time synchronization, etc. The LTF is a field for signals for channel estimation, frequency error estimation, etc. Both the STF and the LTF may be referred to as a PCLP preamble. The PLCP preamble may be a signal for synchronization of an OFDM physical layer and channel estimation.

The SIG field may include a Rate field and a Length field. The Rate field may include information about data modulation and coding rate. The Length field may include information about the length of data. Additionally, the SIG field may include a parity bit, a SIG tail bit, etc.

The Data field may include a Service field, a PLCP service data unit (PSDU), and a PPDU tail bit and may further include a padding bit when necessary. Some bits of the Service field may be used for synchronization of a descrambler in a receiver. The PSDU may correspond to a MAC packet data unit (PDU) defined in a MAC layer and include data generated/used in a higher layer. The PPDU tail bit may be used to return an encoder to the state of 0. The padding bit may be used to adjust the length of the data field to a predetermined unit.

The MAC PDU is defined according to various MAC frame formats. A basic MAC frame includes a MAC header, a frame body, and a frame check sequence (FCS). The MAC frame may be comprised of the MAC PDU and may be transmitted/received through a PSDU of a data part of the PPDU frame format.

Meanwhile, a null-data packet (NDP) frame format refers to a frame format which does not include a data packet. That is, the NDP frame includes only a PLCP header (i.e. an STF, an LTF, and a SIG field) in a normal PPDU format and does not include the other part (i.e. a data field). The NDP frame may also be referred to as a short frame format.

Active Polling

Active polling allows an STA to poll an AP immediately after the STA wakes up. That is, active polling allows the STA to perform a polling operation (e.g. transmission of a PS-Poll frame) without listening to a beacon after wakeup. Such an STA may be referred to as a non-TIM STA in that the STA can perform polling without checking a TIM element included in a beacon frame. Meanwhile, an STA that performs polling when there is data to be transmitted thereto according to the TIM element included in the beacon frame may be referred to as a TIM STA.

Active polling may be classified into scheduled active polling and unscheduled active polling.

In scheduled active polling, an AP may schedule the wakeup time of an STA and the STA may wake up at the scheduled time and perform an operation for uplink/downlink (UL/DL) transmission. The STA need not track a beacon.

In unscheduled active polling, the AP may allow an STA or a group of STAs to transmit a UL frame at any time when the STA or the group of STAs wakes up. The STA need not track a beacon.

Meanwhile, an active polling STA that does not track the beacon may miss information updated in the beacon and timestamp information. Accordingly, the active polling STA may request that the AP provide the above information when the STA wakes up. The AP may immediately provide the requested information to the STA or may inform the STA that the requested information may be received through the next beacon. To this end, the AT may provide a timer to receive the next beacon to the STA.

Restricted Access Window (RAW)

A RAW refers to a time slot during which only a specific STA or a specific group of STAs is allowed to perform channel access. An AP may inform the STA(s) of RAW allocation information through a beacon.

Figure 13:
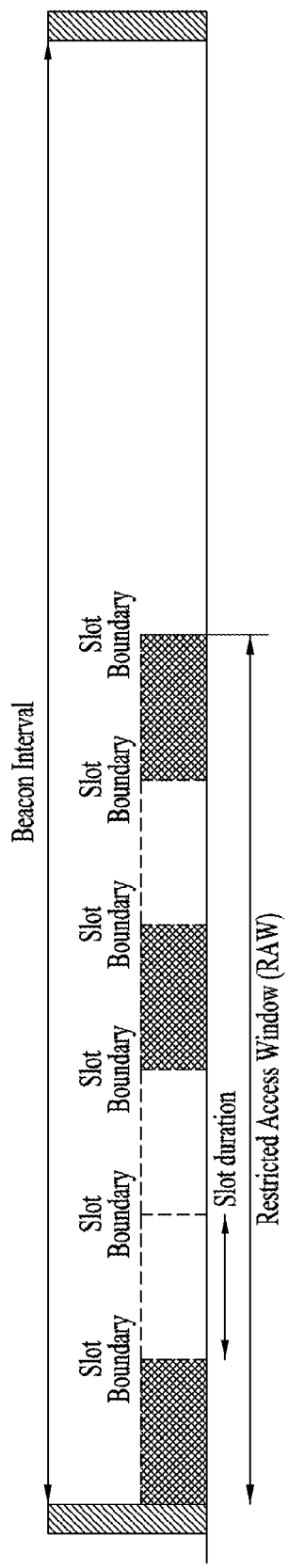
FIG. 13 is a diagram for explaining RAW allocation.

FIG. 13 is a diagram for explaining RAW allocation.

One or more RAWs may be configured in one beacon interval. A RAW may be divided into one or more time slots. If a plurality of slots is configured in a RAW, a time reference for distinguishing between the slots is referred to as a slot boundary. The length of one slot is referred to as a slot duration.

A general procedure of an STA in a RAW will now be described. The STA wakes up at a target beacon transmission time (TBTT) and listens to a beacon frame through which the STA may be aware of information about a slot duration in each RAW. If a plurality of slots is present in one RAW, slot durations may be equally set. Meanwhile, slot durations in different RAWs may be differently set. The STA may determine a slot in which channel access thereof is allowed according to allocation by the AP. The STA may sleep before the channel access slot thereof.

In relation to UL channel access, the STA may start to perform channel access based on EDCA at a slot boundary of the channel access slot thereof The AP may indicate whether a transmission opportunity (TXOP) or transmission within the TXOP is extended across a slot boundary. If transmission of the STA is not allowed to extend across the slot boundary, the STA may perform channel access without waiting for a time corresponding to ProbeDelay when waking up at the slot boundary.

In relation to a DL bufferable unit (BU) delivery procedure, the AP may indicate a channel access slot to a paged STA and the STA may perform contention in the slot. Indication of the channel access slot may be based on a TIM of a beacon. The paged STA may start contention at the slot boundary. After receiving the TIM, the STA may transmit a PS-Poll or a Trigger frame to the AP based on EDCA after the slot boundary of the channel access slot thereof. The AP may indicate that the AP will transmit traffic to the paged STA after a DL BU delivery slot. The DL BU delivery slot for each STA may be indicated by a management frame after all PS-Poll or Trigger frame transmission is completed. The AP may protect the PS-Poll or Trigger frame by setting a NAV. The paged STA may ignore the NAV set by the AP. If the NAV is set, only paged STAs may transmit the PS-Poll or Trigger frame in the RAW.

In relation to a UL frame delivery procedure, the AP may allow the STA or the group of STAs to transmit a UL frame at any time. Alternatively, the AP may assign to the STA or the group of STAs a channel access slot in which the STA or the group of STAs is allowed to perform contention through a beacon frame. In this case, the STA may wake up at a TBTT and listen to the beacon frame. The STA may determine the channel access slot thereof based on information in the beacon frame. The STA may start to perform channel access based on EDCA after the slot boundary of the channel access slot thereof. When requested by the STA, the AP may assign the channel access slot to the STA. In this case, the STA may start to perform channel access based on EDCA after the slot boundary of the channel access slot thereof.

Referring to FIG. 13, a RAW duration may be expressed as $T_{RAW}$ and a slot duration may be denoted as $T_S$. Then, a parameter $N_{RAW}$ is defined as $N_{RAW}=T_{RAW}/T_S$. A slot mapping function is defined as indicated in Equation 1.

$$f(x)=(x+N_{offset}) \bmod N_{RAW}=i \quad \text{[Equation 1]}$$

In Equation 1, i is a slot index assigned to the STA.

If the RAW is assigned for both paged STAs and unpaged STAs, x in Equation 1 is the AID of an STA.

If the RAW is restricted only to paged STAs, x in Equation 1 is a position index of a specific paged STA among all paged STAs when AIDs of the STAs are sequentially arranged. For example, if there are n paged STAs in front of the specific paged STA based on the AIDs, then x=n (it is assumed that the bit position of the first paged STA is defined as x=0).

In Equation 1, $N_{offset}$ is an offset value provided to consider fairness between STAs indicated in the TIM. For example, a timestamp or an FCS may be used as the offset value.

In Equation 1, mod indicates a modulo operation.

RAW assignment described above may be defined by a RAW parameter set (RPS) information element (IE) included in a Beacon frame or short Beacon frame. The RPS IE may include subfields as shown in Table 1 below.

TABLE 1

| Field | Value | Interpretation |
|---|---|---|
| Page ID | Not decided | Indicates a page index for a hierarchical AID of an allocated group. |

TABLE 1-continued

| Field | Value | Interpretation |
|---|---|---|
| Block Offset | Not decided | Assuming 32 blocks per page, this field indicates a start block index of the allocated group. |
| Block Range | Not decided | Indicates the number of blocks (starting from the block offset) for the allocated group. |
| RAW Start Time | 8 bits | Duration in time units (TUs) from the end of beacon transmission to RAW start time |
| RAW Duration | Not decided | Duration of RAW in TU |
| Access restricted to paged STA only | 2 bits | Bit 1: Set to 1 if only STAs with their TIM bit set to 1 are allowed to perform UL transmission. Bit 2: Set to 1 if RAW is reserved for frames with duration smaller than slot duration (e.g. PS-Poll or Trigger frame (Bit 2 is ignored if Bit 1 is not set). |
| Group/Resource allocation frame indication | 1 bit | Set to 1 to indicate the case in which STAs need to wake up at the beginning of the RAW to receive group addressed frames such as resource allocation. |
| Slot definition | Not decided | Includes slot duration signaling, slot assignment to STA, and cross boundary transmission allowed/not allowed. |

There may be a RAW in which TIM STAs are not allowed to perform channel access among RAWs and the AP may inform the TIM STAs of information about such a RAW. A non-TIM STA enables active polling without the need of listening to a beacon and enables active polling. Therefore, the non-TIM STA is capable of performing channel access for a polling operation at a wakeup time. The AP may inform the TIM STAs of a RAW in which access by the TIM STAs is prohibited and, as a result, the RAW may be used as a time duration during which non-TIM STAs may perform channel access.

In addition, a periodic RAW (PRAW) may be set up. The AP may allocate a resource for scheduled active polling STAs and indicate resource allocation information to the STAs. Information about the PRAW may be indicated not through a short beacon frame but through a normal beacon frame. Once the PRAW is set up, the AP may periodically allocate the resource to a group of the scheduled active polling STAs. A resource allocated for the PRAW may not be changed until updated PRAW information is broadcasted. The resource for a scheduled active polling STAs may be allocated within a PRAW duration. If the scheduled active polling STA has data packet to be transmitted, the STA may wake up at a designated slot in the PRAW and transmit a packet after performing basic CCA. The TIM STAs are not allowed to access a channel in the PRAW. Within the PRAW, each STA may perform EDCA based channel access.

Improved RAW Allocation Method

As described previously, the channel access slot of the STA may be allocated through the RPS IE and the STA may attempt to perform channel access at the allocated slot. If a field indicating whether cross boundary transmission is allowed or not in slot definition of the RPS IE is set to 1, the STA cannot perform channel access extended across a slot boundary allocated thereto (i.e. in a slot for another STA).

If the field indicating whether cross boundary transmission for a slot is allowed or not is set to 0, the STA may continue to perform channel access extended across the slot boundary allocated thereto (i.e. in a slot for another STA). However, since slots are not present after the end point of the RAW or the boundary of the RAW, even though transmission extended across the slot boundary is allowed (i.e. cross boundary transmission is allowed), there is no definition as to whether the STA to which a slot is allocated before the end point of the RAW can continue to perform channel access extended across the end point of the RAW. Meanwhile, if cross boundary transmission for the slot is not allowed, the STA does not perform transmission extended across the slot allocated thereto, there is no problem about whether transmission extended across the end point of the RAW will continue. Notably, in the case in which whether cross boundary transmission is allowed may be changed at a certain time in the duration of the RAW, if the STA to which the slot before the end point of the RAW is allocated may continue to perform channel access extended across the end point of the RAW is not clearly designated, a problem may arise because the operation of the STA cannot be clearly defined.

If it is defined in a system that a RAW end point (or RAW boundary) is not extended, the STA to which a slot in a RAW is allocated may stop transmission at the RAW end point (or RAW boundary) and attempt to perform retransmission at another point at which channel access thereof is allowed. If it is defined in the system that the RAW end point (or RAW boundary) can be extended, the STA to which the slot in the RAW is allocated may perform channel access extended across the RAW end point (or RAW boundary).

If it is defined in the system that the RAW boundary is not extended, a channel cannot be used after the RAW boundary even when the channel is in idle mode. As a result, channel usage efficiency may be deteriorated. If it is defined in the system that the RAW boundary can be extended, there is a high probability of collision in channel access due to congestion when another RAW is present after the end of any RAW or a target wake time (TWT) for a non-TIM STA is present. In addition, when a PRAW is present after the end point of any RAW, if the STA cannot be aware of the region of the PRAW (e.g. an RPS IE for the PRAW is provided only in an initial beacon and is not provided in a current beacon or a short beacon), congestion in the PRAW may occur.

According to a conventional RAW allocation method, whether transmission extended across the RAW end point (or RAW boundary) is allowed is not defined and the system cannot indicate in which manner the STA is to operate, thereby deteriorating overall system performance due to uncertainty as to the operation of the STA. To overcome the above problem, the present invention proposes a method for adaptively establishing whether transmission extended across the RAW end point (or RAW boundary) is allowed. Then the efficiency of resource usage can be increased on a RAW basis or dynamically in consideration of a system environment.

Specifically, according to the present invention, the AP may provide a beacon including information indicating whether to allow the STA to perform channel access extended across the end point of a RAW upon allocating the RAW to the STA through the beacon. For example, a field indicating whether transmission extended across a RAW boundary is allowed (e.g. a RAW cross boundary transmission allowance field) may be additionally defined. Table 2 shows an example of an RPS IE including this new field.

TABLE 2

| Field | Value | Interpretation |
|---|---|---|
| Page ID | Not decided | Indicates a page index for a hierarchical AID of an allocated group. |
| Block Offset | Not decided | Assuming 32 blocks per page, this field indicates a start block index of the allocated group. |
| Block Range | Not decided | Indicates the number of blocks (starting from the block offset) for the allocated group. |
| RAW Start Time | 8 bits | Duration in time units (TUs) from the end of beacon transmission to RAW start time |
| RAW Duration | Not decided | Duration of RAW in TU |
| RAW cross boundary transmission allowance | 1 bit | Indicates whether TXOP or transmission within TXOP can be extended across a RAW boundary. 0: TXOP or transmission within TXOP cannot be extended across the RAW boundary. 1: TXOP or transmission within TXOP can be extended across the RAW boundary. |
| Access restricted to paged STA only | 2 bits | Bit 1: Set to 1 if only STAs with their TIM bit set to 1 are allowed to perform UL transmission. Bit 2: Set to 1 if RAW is reserved for frames with duration smaller than slot duration (e.g. PS-Poll or Trigger frame (Bit 2 is ignored if Bit 1 is not set). |
| Group/Resource allocation frame indication | 1 bit | Set to 1 to indicate the case in which STAs need to wake up at the beginning of the RAW to receive group addressed frames such as resource allocation. |
| Slot definition | Not decided | Includes slot duration signaling, slot assignment to STA, and cross boundary transmission allowed/not allowed. |

If transmission extended across the RAW boundary is allowed, the AP may set the value of the RAW cross boundary transmission allowance (CBTA) field to a first value (or 1) and perform transmission. If transmission extended across the RAW boundary is not allowed, the AP may set the value of the RAW CBTA field to a second value (or 0) and perform transmission. For example, the value of the RAW CBTA may be set to 0, when RAW2 is present after RAW 1, when many STAs are allocated to RAW2, when a PRAW is allocated after RAW1, when an emergency DL frame that should be transmitted is present after RAW1, and when a TWT of non-TIM STA(s) is set after RAW1.

Figure 14:
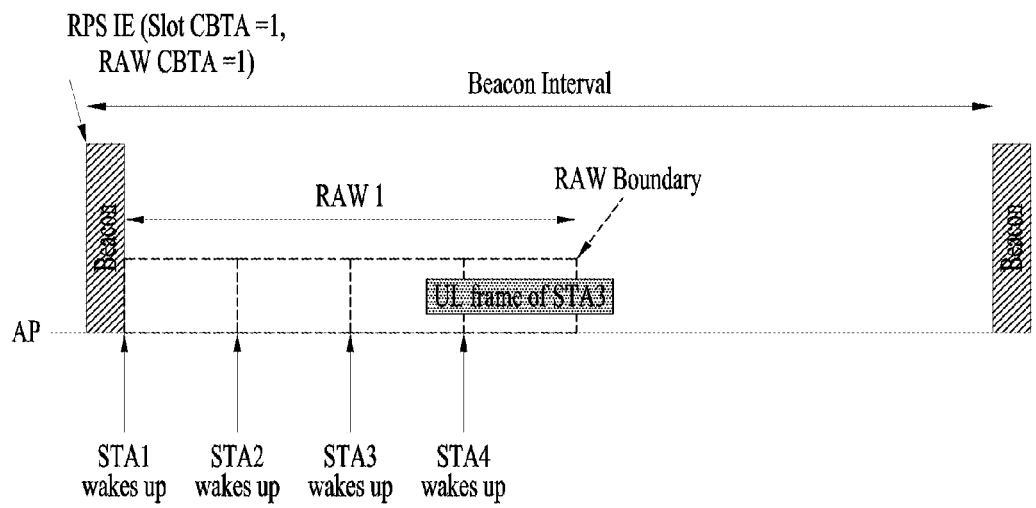
FIGS. 14 to 19 are diagrams for explaining exemplary RAW allocation methods according to the present invention.

FIG. 14 is a diagram for explaining an exemplary RAW allocation method according to the present invention.

In the illustrated example of FIG. 14, it is assumed that the value of a slot CBTA (i.e. information indicating whether transmission extended across a slot boundary is allowed) is set to 1 and the value of a RAW CBTA (i.e. information indicating whether transmission extended across a RAW boundary is allowed) is set to 1 in an RPS IE for RAW1 provided through a beacon. Although the RAW CBTA may be set to 1 in consideration of the fact that another RAW is not present after RAW1, the reason why the RAW CBTA is set to 1 is not limited thereto. Since the RAW CBTA is set to 1, an STA to which a slot in RAW1 is allocated may transmit a UL frame across a RAW boundary. In addition, it is assumed that the first, second, third, and fourth slots in RAW1 are allocated to STA1, STA2, STA3, and STA4, respectively. For example, STA1 and STA2 that do not have the UL frame to be transmitted may not attempt to perform channel access in the first and second slots. Meanwhile, STA3 to which the third slot is allocated may wake up and transmit the UL frame based on EDCA. The frame may be continuously transmitted across a slot boundary and across a RAW boundary as well. Although STA4 may wake up at the boundary of the slot allocated thereto and have a UL frame to be transmitted, STA4 cannot transmit the UL frame because STA3 has occupied a channel.

Figure 15:
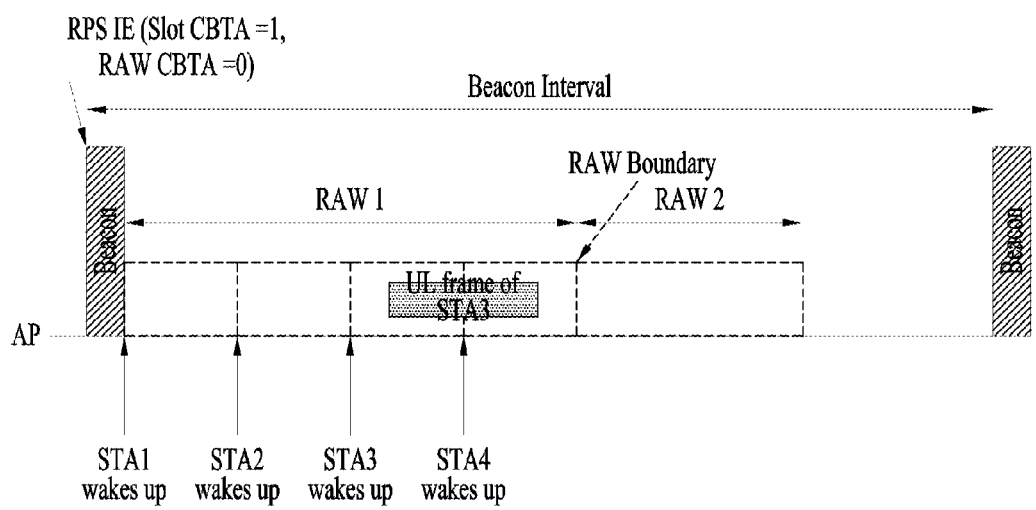

FIG. 15 is a diagram for explaining another exemplary RAW allocation method according to the present invention.

In the illustrated example of FIG. 15, it is assumed that the value of a slot CBTA is set to 1 and the value of a RAW CBTA is set to 0 in an RPS IE for RAW1 provided through a beacon. Although the RAW CBTA may be set to 0 in consideration of the fact that RAW2 is not present after RAW1, the reason why the RAW CBTA is set to 0 is not limited thereto. Since the RAW CBTA is set to 0, an STA to which a slot in RAW1 is allocated cannot transmit a UL frame across a RAW boundary. For example, STA1 and STA2 that do not have the UL frame to be transmitted may not attempt to perform channel access in the first and second slots. Meanwhile, STA3 to which the third slot is allocated may wake up and transmit the UL frame based on EDCA. The frame may be continuously transmitted across a slot boundary but cannot be transmitted across the RAW boundary. Therefore, UL frame transmission of STA3 should be completed or stopped before a RAW end point. Although STA4 may wake up at a boundary of a slot allocated thereto and have the UL frame to be transmitted, STA4 cannot transmit the UL frame because STA3 has occupied a channel.

Figure 16:
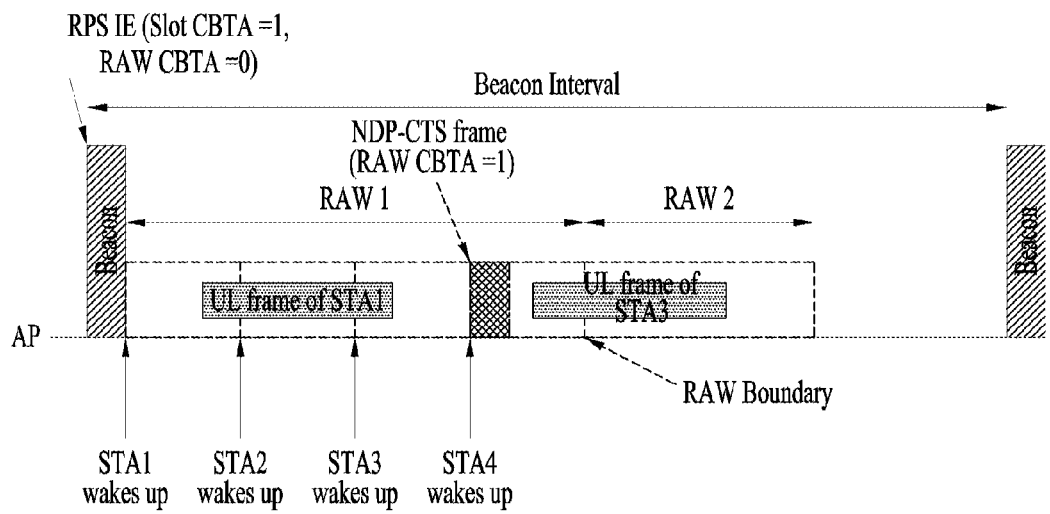

FIG. 16 is a diagram for explaining another exemplary RAW allocation method according to the present invention.

Although a RAW CBTA is basically included in an RPS IE transmitted through a beacon, the value of the RAW CBTA may be changed in the middle of a beacon interval. To this end, the value of the RAW CBTA may be set through a prescribed frame transmitted from an AP in the middle of the beacon interval. The prescribed frame in which RAW CBTA information is transmitted in the middle of the beacon interval may be an NDP frame (e.g., an NDP-CTS frame or an NDP-ACK frame) or may be a normal control frame (e.g. a CTS frame or an ACK frame).

In the illustrated example of FIG. 16, it is assumed that the value of a slot CBTA is set to 1 and the value of a RAW CBTA is set to 0 in an RPS IE for RAW1 provided through a beacon. Since the value of the RAW CBTA is set to 0, an STA to which a slot in RAW1 is allocated cannot transmit a UL frame across a RAW boundary. An AP may transmit in the fourth slot of RAW1 an NDP frame (e.g. an NDP-CTS frame in FIG. 16) including a RAW CBTA field. In this case, the value of the RAW CBTA field may be set to 1. STA(s) that receive the NDP frame and to which a slot in RAW1 is allocated may transmit a UL frame across the RAW boundary.

For example, it is assumed that the first, second, third, and fourth slots in RAW1 are allocated to STA1, STA2, STA3, and STA4, respectively. For example, STA1 to which the first slot is allocated may wake up and transmit the UL frame based on EDCA. The frame may be continuously transmitted across a slot boundary. Although STA2 and STA3 may wake up at the second slot and the third slot, respectively, and have the UL frame to be transmitted, STA2 and STA3 cannot transmit the UL frame because STA1 has occupied a channel. STAs of a wakeup state in the fourth slot may receive an NDP-CTS frame in which the RAW CBTA is set to 1 (i.e. the value of the RAW CBTA which has been set to 0 is changed to 1). Since STA4 in the fourth slot wakes up and has the UL frame to be transmitted, STA2, STA3, and STA4 may attempt to perform channel access in the fourth slot. STA3 may transmit the UL frame through contention. Since the value of the RAW CBTA is set to 1, STA3 may continue to transmit the UL frame across the RAW boundary. That is, as illustrated in FIG. 16, UL frame transmission of STA3 starting at the fourth slot of RAW1 may be continuously performed even in RAW2.

Figure 17:
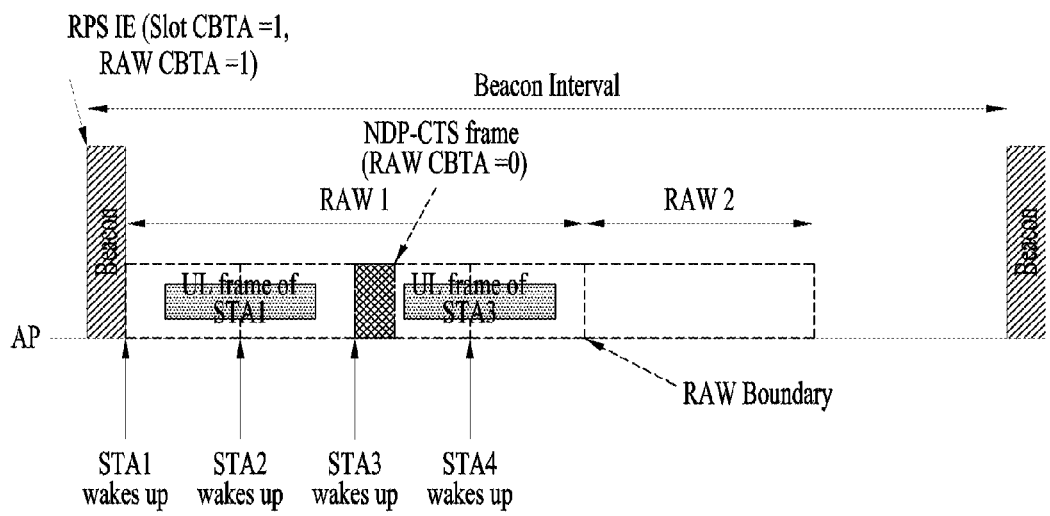

FIG. 17 is a diagram for explaining another exemplary RAW allocation method according to the present invention.

In the illustrated example of FIG. 17, it is assumed that the value of a slot CBTA is set to 1 and the value of a RAW CBTA is set to 1 in an RPS IE for RAW1 provided through a beacon. Since the RAW CBTA is set to 1, an STA to which a slot in RAW1 is allocated may transmit a UL frame across a RAW boundary. In addition, it is assumed that the first, second, third, and fourth slots in RAW1 are allocated to STA1, STA2, STA3, and STA4, respectively. For example, STA1 may wake up at a boundary of a slot allocated thereto and transmit the UL frame based on EDCA. The frame may be continuously transmitted across the slot boundary. Although STA2 wakes up at the second slot and has a UL frame to be transmitted, STA2 cannot transmit the UL frame because STA1 has occupied a channel. STA2 may be aware through an ACK frame transmitted by the AP to STA1 that channel use of STA1 has been completed or may recognize that a channel is in an idle state upon receiving a frame such as an NDP-CTS frame. Then, STA2 may attempt to use the channel.

STAs of a wakeup state in the third slot may receive the NDP-CTS frame in which the RAW CBTA is set to 0 (i.e. the value of the RAW CBTA which has been set to 1 is changed to 0). Since STA3 in the third slot wakes up and has the UL frame to be transmitted, STA2 and STA3 in the third slot may attempt to perform channel access in the third slot. STA3 may transmit the UL frame through contention. Since the value of the RAW CBTA is set to 0, an STA to which a slot in RAW1 is allocated cannot transmit the UL frame across the RAW boundary. That is, as illustrated in FIG. 17, although UL frame transmission of STA3 starting at third slot of RAW1 may continue across the slot boundary but cannot continue across the RAW boundary. Accordingly, UL frame transmission of STA3 should be completed or stopped before the end point of RAW1. Meanwhile, although STA4 wakes up at a boundary of a slot allocated thereto and has the UL frame to be transmitted, STA4 cannot transmit the UL subframe because STA3 has occupied a channel.

In this case, since STA4 has not received the NDP-CTS frame in which the value of the RAW CBTA is set to 0 (i.e. since STA4 is in a sleep state before the fourth slot), STA4 recognizes the value of the RAW CBTA as 1 as configured through the RPS IE of the beacon. Accordingly, STA4 may attempt to perform UL frame transmission extended across the RAW boundary. That is, only STA4 recognizes the value of the RAW CBTA as 1 although other STAs recognize the value of the RAW CBTA as 0.

To prevent this problem, a predetermined frame including the value of the RAW CBTA before the RAW boundary may be transmitted. The predetermined frame for transmitting RAW CBTA information before the RAW boundary may be an NDP frame (e.g. an NDP-CTS frame or an NDP-ACK frame) or may be a normal control frame (e.g. a CTS frame or an ACK frame).

Figure 18:
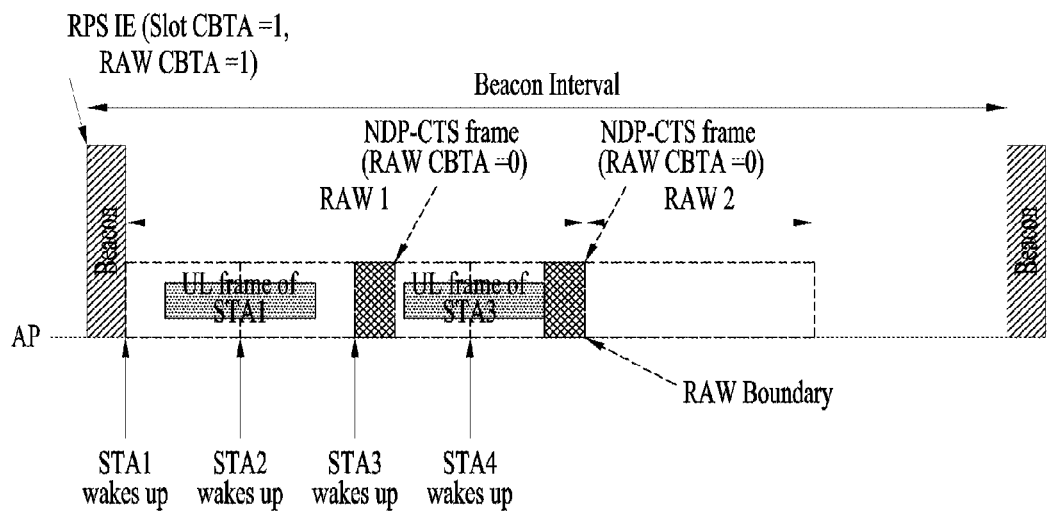

FIG. 18 is a diagram for explaining another exemplary RAW allocation method according to the present invention.

In the illustrated example of FIG. 18, operation up to the third slot is the same as operation in FIG. 17 and, therefore, a repetitive description is omitted.

As illustrated in FIG. 18, an NDP-CTS frame (i.e. an NDP frame in which the value of a RAW CBTA is set to 0) transmitted in the third slot of RAW1 may be received by STA2 and STA3 of a wakeup state but cannot be received by STA4 of a sleep state. That is, STA2 and STA3 recognize the value of RAW CBTA as 0 as configured through the NDP-CTS frame, whereas STA4 recognizes the value of the RAW CBTA as 1 as configured through a beacon frame. Therefore, UL frame transmission of STA3 starting at the third slot of RAW1 may continue across a slot boundary but should be completed or stopped prior to the end point of RAW1. Meanwhile, although STA4 wakes up at a boundary of a slot allocated thereto and has a UL frame to be transmitted, STA4 cannot transmit the UL frame because STA3 has occupied a channel and may attempt to access the channel when channel occupation by the STA3 is ended.

In this case, an AP may transmit an NDP-CTS frame including a RAW CBTA set to 0 before the RAW boundary of RAW1 and STA4 of a wakeup state may receive the NDP-CTS frame. Then, STA4 may recognize the value of the RAW CBTA set to 0 and may not attempt to perform channel access extended across the RAW boundary.

Meanwhile, in addition to STA4, other STA(s) of a wakeup state (e.g. STA2 and STA3) may receive the NDP-CTS frame including RAW CBTA information transmitted before the RAW boundary. In this case, STA2 and STA3 may determine whether to perform transmission extended across the RAW boundary according to the lastly received RAW CBTA information. In the illustrated example of FIG. 18, since the value of the RAW CBTA set with respect to STA2 and STA3 is 0 and the value of additionally received RAW CBTA before the RAW boundary is also 0, the value of the final RAW CBTA may be recognized as 0.

Figure 19:
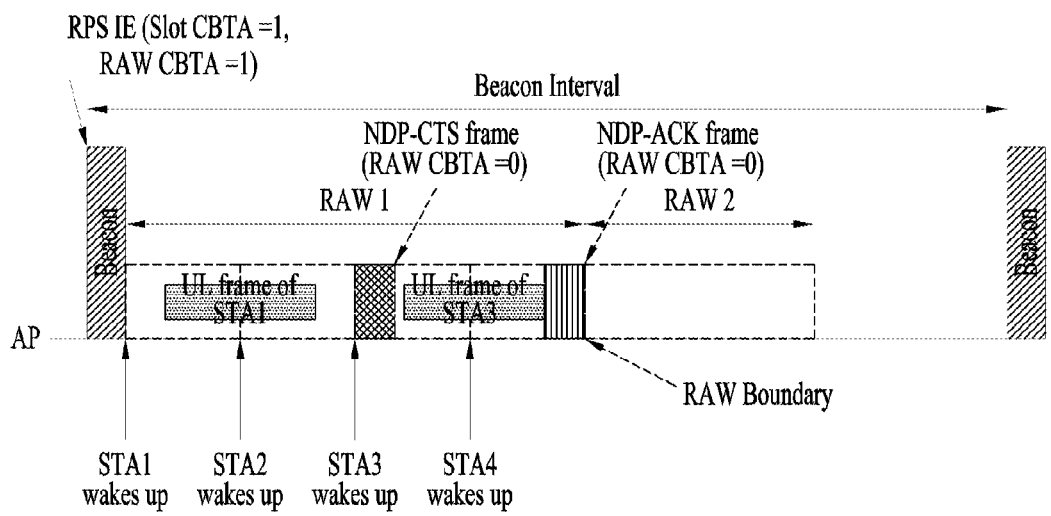

FIG. 19 is a diagram for explaining another exemplary RAW allocation method according to the present invention.

Compared with FIG. 18, the illustrated example of FIG. 19 represents that an AP may include the value of a RAW CBTA in a response frame upon transmitting the response frame (e.g. an ACK frame or an NDP-ACK frame) to a UL frame transmitted by STA3, instead of transmitting the NDP-CTS frame before the RAW boundary.

In the illustrated examples of FIGS. 16 to 19, in addition to the method for providing the RAW CBTA information using the NDP frame (e.g. the NDP-CTS frame or the NDP-ACK frame) or instead of providing the RAW CBTA information, information for permitting or scheduling channel access of a specific STA at a specific slot may be provided through the NDP frame. Such an operation is referred to as a polling operation of slot unit scheduling for the specific STA. Therefore, since whether to permit channel access of any STA at a specific slot is dynamically scheduled, the efficiency of resource usage can be improved.

Although FIG. 16 to FIG. 19 show that examples of providing the RAW CBTA information through the NDP frame (e.g. the NDP-CTS frame or NDP-ACK frame), the present invention is not limited thereto. The RAW CBTA information may be provided by the AP to an STA in the middle of a beacon interval or before the RAW boundary through the normal control frame (e.g. the CTS frame or ACK frame).

Figure 20:
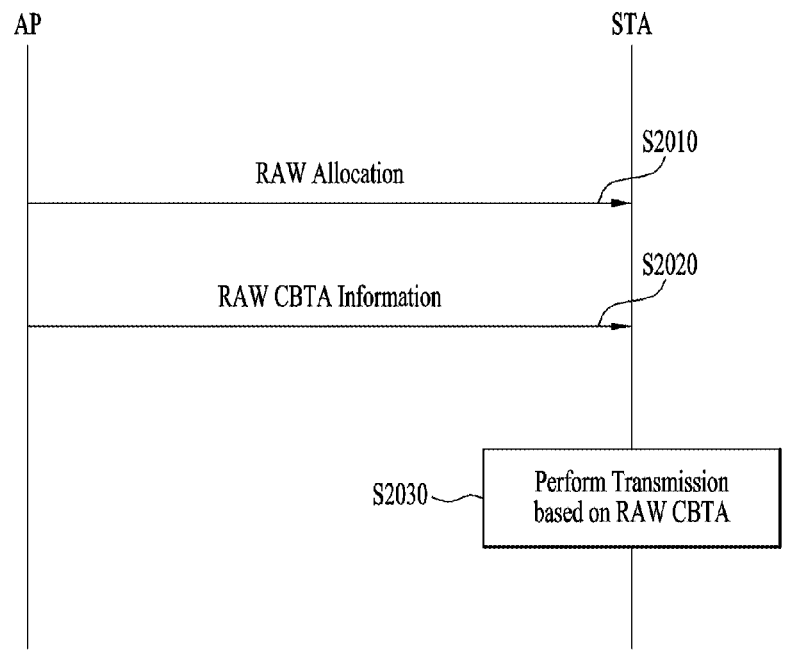
FIG. 20 is a diagram for explaining a RAW based channel access method according to an embodiment of the present invention.

FIG. 20 is a diagram for explaining a RAW based channel access method according to an embodiment of the present invention.

In step S2010, an AP may allocate a RAW to an STA. For example, the AP may provide RAW allocation information through an RPS IE of a beacon frame.

In step S2020, the AP may provide RAW CBTA information to the STA.

In step S2030, the STA may determine whether to perform transmission extended across a RAW boundary based on the RAW CBTA information and perform a transmission operation according to the determined result.

The RAW allocation information of step S2010 and the RAW CBTA information of step S2020 may be provided to the STA through the RPS IE included in the beacon frame. Even after the RAW CBTA is transmitted to the STA through the beacon frame, additional RAW CBTA information may be provided to the STA in the middle of a RAW.

Although the exemplary method described with reference to FIG. 20 has been expressed as a series of operations for clarity, this is not intended to limit order in which steps are performed. When necessary, the steps may be performed at the same time or in a different order. Further, all of the steps shown in FIG. 20 are not always needed to implement the method proposed in the present invention.

In the above-described method of the present invention, the various embodiments of the present invention may be independently applied or two or more embodiments thereof may be simultaneously applied.

Figure 21:
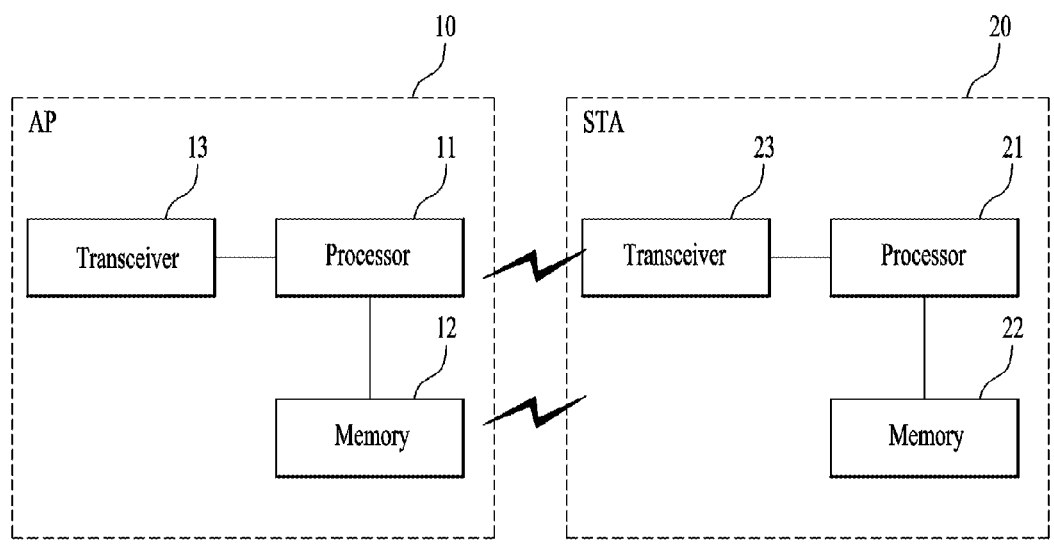
FIG. 21 is a block diagram illustrating a radio device according to an embodiment of the present invention.

FIG. 21 is a block diagram illustrating a radio device according to an embodiment of the present invention.

An AP 10 may include a processor 11, a memory 12, and a transceiver 13. An STA 20 may include a processor 21, a memory 22, and a transceiver 23. The transceivers 13 and 23 may transmit/receive radio signals and may implement a physical layer based on an IEEE 802 system. The processors 11 and 21 are connected to the transceivers 13 and 21, respectively, and may implement a physical layer and/or a MAC layer based on the IEEE 802 system. The processors 11 and 21 may be configured to perform operations according to the above-described various embodiments of the present invention. Modules for implementing operations of the AP and STA according to the above-described various embodiments of the present invention may be stored in the memories 12 and 22 and carried out by the processors 11 and 21. The memories 12 and 22 may be included in the processors 11 and 21 or may be installed at the exterior of the processors 11 and 21 to be connected by a known means to the processors 11 and 21.

The processor 11 of the AP 10 may be configured to transmit RAW CBTA information to the STA 20 using the transceiver 13 when a RAW is allocated to the STA 20. The processor 21 of the STA 20 may be configured to receive the RAW CBTA information from the AP 10 using the transceiver 23 when the RAW allocated by the AP 10 is received. Then, the processor 21 of the STA 20 may be configured to perform transmission from the STA 10 based on the RAW CBTA information. For example, if the RAW CBTA information is set to a first value, transmission of the STA extended across a boundary of the RAW is allowed and, therefore, the processor 21 may be configured to attempt to perform transmission from the STA 20 after the boundary of the RAW using the transceiver 23. If the RAW CBTA information is set to a second value, transmission of the STA extended across the boundary of the RAW is not allowed and, therefore, the processor 21 may be configured not to perform transmission from the STA 20 after the boundary of the RAW.

The detailed configuration of the AP and STA may be implemented such that the above-described various embodiments of the present invention are independently applied or two or more embodiments thereof are simultaneously applied. A repeated description is omitted for clarity.

The above-described embodiments may be implemented by various means, for example, by hardware, firmware, software, or a combination thereof In a hardware configuration, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments are applicable in the same manner to various mobile communication systems.

The invention claimed is:

1. A method for performing channel access by a station (STA) in a wireless communication system, the method comprising:
receiving restricted access window (RAW) cross boundary transmission allowance (CBTA) information and slot CBTA information from an access point (AP) when a RAW is allocated to the STA,
wherein the RAW CBTA information indicates whether or not channel access is allowed beyond a boundary between different RAWs, and
wherein the slot CBTA information indicates whether or not channel access is allowed beyond a boundary between different slots of the RAW; and
performing transmission with the AP based on the RAW CBTA information,
wherein, when the slot CBTA information indicates granting of channel access beyond the boundary between the different slots, and the RAW CBTA information is set to a first value that indicates that channel access is allowed beyond the boundary between the different RAWs, transmission of the STA extended across the boundary between the different RAWs is permitted.

2. The method according to claim 1, wherein, when the RAW CBTA information is set to a second value, transmission of the STA extended across the boundary between the different RAWs is not permitted.

3. The method according to claim 1, wherein the RAW is divided into one or more slots and, when transmission of the STA extended across the boundary between the different slots is permitted, transmission from the STA is performed based on the RAW CBTA information.

4. The method according to claim 1, wherein the RAW CBTA information is included in a RAW parameter set information element (RPS IE).

5. The method according to claim 4, wherein the RPS IE is received from the AP through a beacon frame.

6. The method according to claim 1, wherein one or more RAW CBTA information are received from the AP in the middle of the RAW.

7. The method according to claim 6, wherein the one or more RAW CBTA information are received from the AP through a null-data packet (NDP) frame or a control frame.

8. The method according to claim 7, wherein the NDP frame is an NDP clear-to-send (CTS) frame or an NDP acknowledgement (ACK) frame.

9. The method according to claim 7, wherein the control frame is a clear-to-send (CTS) frame or an acknowledgement (ACK) frame.

10. The method according to claim 6, wherein transmission from the STA is performed based on lastly received RAW CBTA information among the one or more RAW CBTA information.

11. The method according to claim 6, wherein the one or more RAW CBTA information are transmitted after start of the different slots of the RAW or before a boundary of the RAW.

12. A method for supporting channel access of a station (STA) by an access point (AP) in a wireless communication system, the method comprising:
transmitting restricted access window (RAW) cross boundary transmission allowance (CBTA) information and slot CBTA information to the STA when a RAW is allocated to the STA,
wherein the RAW CBTA information indicates whether or not channel access is allowed beyond a boundary between different RAWs, and
wherein the slot RAW CBTA information indicates whether or not channel access is allowed beyond a boundary between different slots of the RAW; and
performing transmission with the STA based on the RAW CBTA information,
wherein, when the slot CBTA information indicates granting of channel access beyond the boundary between the different slots, and the RAW CBTA information is set to a first value that indicates that channel access is allowed beyond the boundary between the different RAWs, transmission of the STA extended across the boundary between the different RAWs is permitted.

13. A station (STA) for performing channel access in a wireless communication system, the STA comprising:
a transceiver; and
a processor,
wherein the processor is configured to:
control the transceiver to receive restricted access window (RAW) cross boundary transmission allowance (CBTA) information and slot CBTA information from an access point (AP) when a RAW is allocated to the STA,
wherein the RAW CBTA information indicates whether or not channel access is allowed beyond a boundary between different RAWs, and
wherein the slot CBTA information indicates whether or not channel access is allowed beyond a boundary between different slots of the RAW; and
control the transceiver to perform transmission with the AP based on the RAW CBTA information, and
wherein, when the slot CBTA information indicates granting of channel access beyond the boundary between the different slots, and the RAW CBTA information is set to a first value that indicates that channel access is allowed beyond the boundary between the different RAWs, transmission of the STA extended across the boundary between the different RAWs is permitted.

14. An access point (AP) for supporting channel access of a station (STA) in a wireless communication system, the AP comprising:
a transceiver; and
a processor,
wherein the processor is configured to:
control the transceiver to transmit restricted access window (RAW) cross boundary transmission allowance (CBTA) information and slot CBTA information to the STA when a RAW is allocated to the STA,
wherein the RAW CBTA information indicates whether or not channel access is allowed beyond a boundary between different RAWs, and
wherein the slot CBTA information indicates whether or not channel access is allowed beyond a boundary between different slots of the RAW; and
control the transceiver to perform transmission with the STA based on the RAW CBTA information, and wherein, when the slot CBTA information indicates granting of channel access beyond the boundary between the different slots, and the RAW CBTA information is set to a first value that indicates that channel access is allowed beyond the boundary between the different RAWs, transmission of the STA extended across the boundary between the different RAWs is permitted.

\* \* \* \* \*